May 13, 1958     H. H. HOELZEL     2,834,059

APPARATUS FOR INSTALLING BULK INSULATION MATERIAL

Filed May 28, 1954

INVENTOR.
Herman H. Hoelzel
BY
ATTORNEY.

United States Patent Office 2,834,059
Patented May 13, 1958

2,834,059

APPARATUS FOR INSTALLING BULK INSULATION MATERIAL

Herman H. Hoelzel, Kansas City, Mo.

Application May 28, 1954, Serial No. 433,225

3 Claims. (Cl. 19—72)

This invention relates to the installation of thermal and acoustical insulation material and refers more particularly to an improved apparatus for handling and properly placing the blown insulation material in a pneumatic installation system.

It has become accepted practice in the insulation industry to install loose bulk insulation material, for example mineral fibers such as rock wool, by means of a pneumatic system in which a fibrous material is forced through a conduit and discharged at the end in the form of the stream which is played over or within the area to be insulated. One conventional system designed for this purpose includes a combined hopper and shredder in which the individual fibers are separated from one another to the extent possible, and a conduit, usually a flexible hose, which is connected with the hopper to provide the delivery means for the insulation. A blower or fan is connected with the hopper in such fashion that it performs a shredding operation on the insulation and also creates an air stream through the conduit in which the insulation is dispersed and carried therethrough. The stream of insulation emerging from the end of the conduit is manually played over the area on which the insulation is to be laid, and the fibers are thus deposited in a loose blanket on the supporting surface.

While in general the method described briefly above has proved to be of considerable value, certain problems still remain. First, there is a tendency during travel through the conduit for the individual fibers or particles to engage and interlace with one another and thus ball or wad up in clumps which not only interfere with the smooth travel of the insulation through the conduit but which also prevent a uniform discharge at the end of the conduit. Second, in many instances there is a large variation at the discharge end of the hose in the density of the insulation stream being discharged therefrom. This makes it difficult to obtain an even distribution of the insulation over a large surface area. Third, some insulation materials which are in themselves of low density have a tendency to dust or spread as they reach the discharge end of the conduit. With insulation materials of this type it is a relatively difficult matter to obtain with present methods and equipment a blanket of insulation which is both uniform in thickness and in density.

It is a primary object of the present invention to provide a pneumatic system in which the foregoing problems are largely eliminated. In my invention the insulation material is subjected during its travel through the conduit to a supplemental carding, combing and shredding step which serves to straighten the fibers and maintain them in a loose, dispersed and unwadded state during their travel through the conduit. In the preferred form of the invention, the supplemental combing and carding step is applied at intervals along the conduit so that any clumps or balls of interlaced fibers formed during travel through the intermediate portion will be separated and broken up prior to discharge.

Another important object of my invention is to provide apparatus in which the rate of flow of the insulation stream in the conduit is retarded slightly at the discharge end to build up the density of the stream while allowing a partial escape of the air pressure. This serves to reduce the dusting tendency of light insulation materials and thus aids the laying of the insulation in a more orderly fashion.

A further object of the invention is to provide suitable apparatus for obtaining the results herein described. In this connection it is an object to provide apparatus which can be employed in conventional systems now in use and which can be incorporated therein with a minimum of effort and expense.

Other objects of the invention together with the features of novelty appurtenant thereto will appear in the course of the following description.

In the accompanying drawings which form a part of the instant specification and are to be read in conjunction therewith and in which like reference numerals indicate like parts in the various views.

Figure 1:
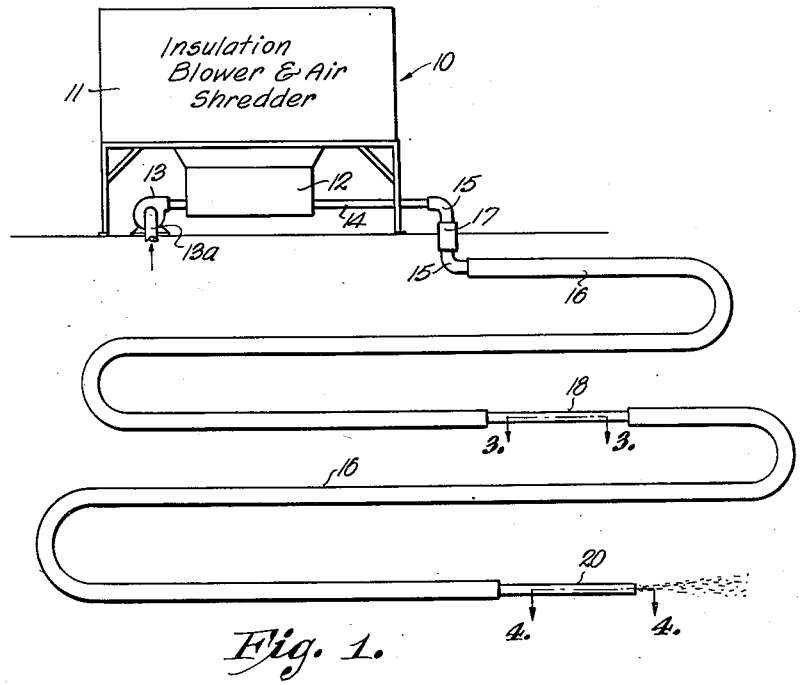
Fig. 1 is a partially diagrammatic view of a pneumatic insulation installation system embodying my invention.

Referring to the drawings and more particularly to Fig. 1, reference numeral 10 indicates generally an insulation blower and air shredder of conventional design. A hopper 11 serves as a container for the bulk insulation material and disposed below the hopper and in communication therewith is the blower section 12 of the unit. A fan or blower 13, having an intake pipe 13a is connected with blower section 12 to supply the high speed air stream thereto, and a discharge pipe 14 for the insulation extends from the opposite side of the blower section. As will be evident from the following description, various types of blowers and shredders may be used in practicing my invention, all of which are well known in the art, and the particular type which I have shown is for purposes of illustration only.

Figure 2:
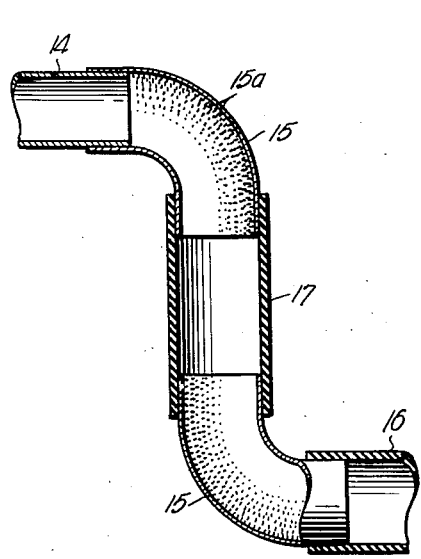
Fig. 2 is a longitudinal section taken through the elbows and coupling at the discharge side of the blower and hopper unit.
Figure 3:
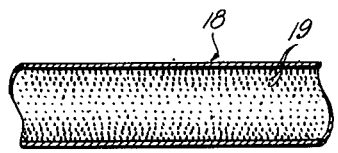
Fig. 3 is an enlarged section taken along the line 3—3 of Fig. 1 in the direction of the arrows.

Connected with the outer end of the discharge pipe 14 through a pair of oppositely disposed elbows or curved pipes 15 is a continuous flexible hose or conduit 16. As is best seen in Fig. 2 each of the elbows 15 is provided on its inner surface throughout the outer half thereof with a large number of internally projecting pins or teeth 15a. These pins or protrusions are preferably sharpened, and are preferably staggered with respect to one another both axially and circumferentially. The elbow or axially curved pipe sections 15 are connected by a smooth coupling 17 and are so disposed with respect to one another to form an S-shaped arrangement. It will be understood, however, that the two elbows can be formed into a single unit having the tooth arrangement shown and described.

As is illustrated in Fig. 1 the flexible hose 16 is preferably divided into two lengths which are interconnected by means of an intermediate tube section 18. Like the elbows 15, the tube 18 is preferably formed of relatively rigid metal and is provided on its inside wall with teeth or projections 19. In the case of the tube 18, however, the teeth are distributed over the entire inside wall. Preferably the teeth are sharply pointed and so arranged that they are staggered both axially and circumferentially to eliminate channeling of the insulation as it passes therethrough. It is also advisable in both the elbows 15 and the tube 18 to use teeth which vary somewhat in length in order to obtain the optimum carding and combing effect. In the conventional hose sizes, i. e. 2½-inch, 3-inch or 3½-inch inside diameter, I have found that a suitable length for the projections or protrusions, depending on the type of insulation being used, is between $\frac{1}{32}$-inch and ½-inch. The spacing on centers between the individual projections can be varied as desired, a suitable range being from ¼-inch to 3-inches. Under normal circumstances, the spacing between the projections in the curved pipes 15 is generally closer than in the tubes 18, and the projections are on the average of a lesser length in the former than in the latter.

As will be appreciated by those skilled in the art, the manufacture of tubes and elbows suitable for use in my method can be accomplished in various ways. One example is to secure the teeth to sheet metal stock, either by driving them through the sheet or by welding or a combination of both, and then forming the sheet into the desired configuration. It will be understood, however, that other arrangements can be adopted, such as the driving of nails or pins through the walls of the flexible hose 16, or through the walls of tubes and elbows constructed of a material which is easily penetrable. Flat, blade-like projections can also be used, the blades being secured to the inside of the tube wall and disposed with the planes of the blades substantially aligned with the axis of the tube.

Figure 4:
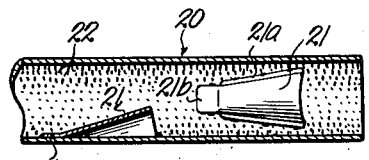
Fig. 4 is an enlarged section taken along the line 4—4 of Fig. 1 in the direction of the arrows.

Located at the end of the flexible hose or conduit 16 and coupled therewith to form an extension of the conduit is another tubular element 20 which will for purposes of description be hereinafter referred to as the nozzle. The nozzle 20 is identical in construction with the tube 18 with the exception that mounted on the inside wall of the nozzle are deflectors or baffles 21 (see Fig. 4). As indicated in the drawing, the baffles or deflectors 21 are preferably spaced longitudinally from one another and are also staggered circumferentially. Each baffle is preferably arcuate in cross-section and increases in depth and width toward the downstream end of the nozzle. The longitudinal edges of the baffle are provided with flanges 21a which are welded to the inside wall of the nozzle; the upstream ends of the baffles are formed with tabs 21b which lie against the wall and are welded thereto. It will be noted that with the exception of the area covered by the baffles 21 the inside of the nozzle is provided with protrusions or teeth 22 like those in the tube section 18.

In the operation of the invention the blower unit 10 is first charged with a suitable bulk insulation material such as organic or inorganic fibers or a mixture of the two. Examples of inorganic fibers normally used are glass, rock wool, slag wool, copper and lead slag or various synthetic fibers. Among the organic fibers are wood, cellulose, animal hair, flax, and paper. The material is subjected to an initial shredding and separating action in the blower section 12 and is delivered to the discharge pipe 14. The elbows 15 serve to further refine and separate the fibers delivered from the blower and prepare the material for movement through the first length of the hose 16. As the insulation emerges from the pipe 14 that part of it which is the upper half of the pipe impinges in against the curved surface of the first elbow 15 and is engaged by the protrusions or teeth projecting therefrom. The engagement of the teeth with the fibers straightens the fibers and separates them from one another. The material passing through the inside half of the first coupling 15 is subjected to the carding and combing in the second elbow which is disposed in the opposite direction. The double curve provided by the two oppositely directed elbows insures that optimum carding and combing will take place since those fibers not engaged by protrusions in the first elbow will be directed against the protrusions in the second. The provision of the teeth only on the outer half of the inside wall of the elbow gives an added advantage in that it creates a relatively turbulent flow and causes the fibers near the center of the stream to be flung outwardly into contact with the teeth.

When the fibers emerge from the S-shaped section provided by the elbows 15, they are in a generally diffuse and loose state. However, during the course of their travel during the first length of the hose or conduit 16, particularly in instances where the conduit is curved or bent in a number of places, the frictional resistance to flow created by the inside wall of the conduit causes a certain amount of interlacing and balling up of the fibers. The intermediate tube 18 is thus provided to subject the insulation to a second carding or combing step which prepares them for their travel through the second length and for delivery to the nozzle 20. The circumferentially and axially staggered arrangement of the teeth in the tubing 18 produces a swirling effect on the insulation which brings the fibers near the center outwardly to engage the teeth as the insulation proceeds through the tube.

The nozzle section 20 serves to produce the final carding and combing step on the fibers and place them in condition for deposit on the surface to be insulated. The baffles 21 within the nozzle serve both to deflect the fibers against the teeth and to slightly impede the flow so that a more dense condition is obtained prior to discharge. The curvature of the baffles and their tapered width are instrumental in obtaining optimum engagement with the teeth without interfering with a continuous flow, and the emerging stream is composed of straight loose fibers which, when deposited, provide a relatively homogeneous blanket of uniform density. I have found that in using the method disclosed herein the loose and diffuse state in which the fibers are finally deposited results in an increase of surface coverage with a given weight of material of not less than 10%. Moreover, the more open and loose arrangement of the deposited material results in better insulation properties. The retardation of flow afforded by baffles 21 counteracts to a large extent the dusting tendency of lighter insulation material and also produces a more uniform stream from the nozzle.

It will be understood that in some instances it may be desirable to utilize systems employing only the intermediate tube 18 or alternatively only the elbows 15 or nozzle 20. For fibers which have little tendency to wad or ball into clumps the elbows 15 and tube 18 may be eliminated. However, the best results are obtained when all of the elements are employed and the insulation subjected at several intervals prior to discharge to a carding and combing step. In this connection, it will be evident that additional tubes 18 can be inserted in the line at closer intervals, if desired, and that the elbows 15 can be located at intermediate points rather than only at the location shown in the drawing.

It will be understood that certain features and subcombinations are of utility and may be employed without reference to other features and subcombinations. This is contemplated by and is within the scope of the claims.

Inasmuch as many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a pneumatic system for laying loose fibrous bulk insulation material which includes a flexible conduit through which the insulation is forced by pneumatic means and from which it is discharged in a continuous stream, the improvement which comprises a tube section coupled with said conduit to form a part thereof, said tube section being provided on its inside wall with a plurality of inwardly extending combing teeth spaced from one another around the inside of and lengthwise of said tube section to comb and separate the fibrous material as it passes therethrough.

2. In a pneumatic system for laying loose fibrous bulk insulation material which includes a flexible conduit through which the insulation is forced by pneumatic means and from which it is discharged in a continuous stream, the improvement which comprises a plurality of tube sections coupled into said conduit at spaced intervals along the length of said conduit and forming a part thereof, said tube sections being provided on their inside walls with a plurality of spaced apart combing teeth extending inwardly from said walls toward the center of the tube sections to comb and separate the fibrous material as it passes therethrough.

3. In a pneumatic system for laying loose fibrous bulk insulation material which includes a flexible conduit through which the insulation is forced by pneumatic means and from which it is discharged in a continuous stream, the improvement which comprises a tube section coupled with said conduit to form a part thereof, said tube section being provided on its inside wall with a plurality of inwardly extending combing teeth spaced from one another around the inside of and lengthwise of said tube section to comb and separate the fibrous material as it passes therethrough, each of said teeth being also staggered both circumferentially and longitudinally with respect to the teeth adjacent thereto.

References Cited in the file of this patent

UNITED STATES PATENTS

| | | |
|---|---|---|
| 600,547 | Mazzanovich | Mar. 15, 1898 |
| 1,056,260 | Cheesman | Mar. 18, 1913 |
| 1,707,335 | Van Brunt | Apr. 2, 1929 |
| 2,200,713 | Ericson | May 14, 1940 |
| 2,320,544 | Gaus et al. | June 1, 1943 |

FOREIGN PATENTS

| | | |
|---|---|---|
| 581,068 | Germany | Sept. 23, 1932 |